(12) United States Patent
Beeson

(10) Patent No.: US 7,966,263 B2
(45) Date of Patent: Jun. 21, 2011

(54) WIRELESS PHONE RF PRESENTATION INSTRUMENT WITH SENSOR CONTROL

(75) Inventor: Curt Beeson, Omaha, NE (US)

(73) Assignee: First Data Corporation, Greenwood Village, CO (US)

( * ) Notice: Subject to any disclaimer, the term of this patent is extended or adjusted under 35 U.S.C. 154(b) by 1039 days.

(21) Appl. No.: 11/695,968

(22) Filed: Apr. 3, 2007

(65) Prior Publication Data

US 2007/0257767 A1 Nov. 8, 2007

Related U.S. Application Data

(63) Continuation-in-part of application No. 11/381,630, filed on May 4, 2006.

(51) Int. Cl.
*G06Q 20/00* (2006.01)
(52) U.S. Cl. .......................... 705/64; 705/67
(58) Field of Classification Search .................. 705/64, 705/67
See application file for complete search history.

(56) References Cited

U.S. PATENT DOCUMENTS

| | | | |
|---|---|---|---|
| 5,585,787 | A | 12/1996 | Wallerstein |
| 5,913,203 | A | 6/1999 | Wong et al. |
| 5,937,394 | A | 8/1999 | Wong et al. |
| 5,955,961 | A | 9/1999 | Wallerstein |
| 5,956,699 | A | 9/1999 | Wong et al. |
| 6,161,762 | A | 12/2000 | Bashan et al. |
| 6,356,196 | B1 | 3/2002 | Wong et al. |
| 6,592,044 | B1 | 7/2003 | Wong et al. |
| 6,604,685 | B1 | 8/2003 | Norton |
| 6,607,127 | B2 | 8/2003 | Wong |
| 6,609,654 | B1 | 8/2003 | Anderson et al. |
| 6,753,341 | B1 | 6/2004 | King |
| 6,805,288 | B2 | 10/2004 | Routhenstein et al. |
| 6,811,082 | B2 | 11/2004 | Wong |
| 7,097,108 | B2 | 8/2006 | Zellner et al. |
| 2002/0096570 | A1 | 7/2002 | Wong et al. |
| 2003/0061168 | A1 | 3/2003 | Routhenstein |
| 2004/0110528 | A1 | 6/2004 | Aoyama et al. |

(Continued)

FOREIGN PATENT DOCUMENTS

WO WO 98/14900 4/1998
WO WO 01/88659 A2 11/2001

OTHER PUBLICATIONS

Australian Patent Application No. 2007248070, Examination Report dated May 11, 2010, 2 pages.

(Continued)

*Primary Examiner* — Pierre E Elisca
(74) *Attorney, Agent, or Firm* — Kilpatrick Townsend & Stockton LLP

(57) ABSTRACT

A mobile communications device is described which includes an input sensor, a memory unit, processing unit, and an antenna configured to wirelessly transmit and receive financial account data for a transaction. The antenna is configured to receive a request for data stored on the memory unit, and may also be configured to induce a voltage from a magnetic field to power certain components of the device. The input sensor may control whether the components can be so powered from the magnetic field. Alternatively, input from the input sensor may otherwise control the functionality of the device. By way of example, data representative of an input received by the input sensor may be transmitted in addition to the requested data.

27 Claims, 12 Drawing Sheets

U.S. PATENT DOCUMENTS

| | | | |
|---|---|---|---|
| 2004/0127256 A1 | 7/2004 | Goldthwaite et al. | |
| 2005/0001712 A1 | 1/2005 | Yarbrough | |
| 2005/0080747 A1 | 4/2005 | Anderson et al. | |
| 2005/0082362 A1 | 4/2005 | Anderson et al. | |
| 2005/0086160 A1 | 4/2005 | Wong et al. | |
| 2005/0086177 A1 | 4/2005 | Anderson et al. | |
| 2005/0091338 A1 | 4/2005 | de la Huerga | |
| 2005/0116050 A1 | 6/2005 | Jei et al. | |
| 2005/0137986 A1 | 6/2005 | Kean et al. | |
| 2005/0162338 A1* | 7/2005 | Ikeda et al. | 345/2.1 |
| 2005/0211760 A1 | 9/2005 | Dewan et al. | |
| 2006/0157563 A1 | 7/2006 | Marshall | |
| 2006/0226951 A1 | 10/2006 | Aull et al. | |
| 2008/0130849 A1* | 6/2008 | Mock et al. | 379/114.01 |
| 2009/0070833 A1* | 3/2009 | Rolf | 725/87 |
| 2010/0087241 A1* | 4/2010 | Nguyen et al. | 463/17 |

OTHER PUBLICATIONS

U.S. Appl. No. 11/381,630, Office Action dated Jun. 26, 2008, 11 pages.

U.S. Appl. No. 11/381,630, filed May 4, 2006, Office Action, 8 pages.

International Search Report and Written Opinion of the International Search Authority dated Nov. 9, 2007 corresponding to PCT International Application No. PCT/US07/68057, filed May 2, 2007.

* cited by examiner

WIRELESS PHONE RF PRESENTATION INSTRUMENT WITH SENSOR CONTROL

CROSS-REFERENCE TO RELATED APPLICATIONS

This application claims priority from and is a continuation-in-part of U.S. patent application Ser. No. 11/381,630, filed May 4, 2006, "RF Presentation Instrument with Sensor Control," which is hereby incorporated by reference, as if set forth in full in this document, for all purposes.

BACKGROUND OF THE INVENTION

The present invention relates to wireless communications in general and, in particular, to a communications device with an integrated RF presentation instrument.

As the size and cost of integrated circuits have continued to progress downward, microprocessors have been incorporated into an ever increasing range of devices. Like integrated circuits, the form factor and cost of wireless components have seen a similar downward progression. With these advancements in technology and manufacturing, contactless smart cards have begun to proliferate. Often, these contactless smart cards are passive, with no internal power supply, and thus are powered wirelessly via a magnetic field or through other means. Alternatively, a small battery may be embedded as a power supply.

One recent development is the integration of a contactless smart card functionality into mobile communications devices. This functionality may be applied to process transactions using credit or debit card accounts. When this presentation instrument functionality is activated (perhaps by a magnetic field produced by a scanner or other point-of-sale device), a user's account information stored thereon may be transmitted via radio signal. Because of this wireless activation and transmission, in many instances there may be an increased risk of theft or other abuse. Components are available which can be configured to snoop or otherwise collect the account information contained in the signals.

While such radio signals may be encrypted, increasingly sophisticated technology is being developed to evade this protection. Hence, for these and other reasons, it may be desirable to implement alternative device configurations that provide for improved security.

BRIEF SUMMARY OF THE INVENTION

In various embodiments of the invention, a mobile communications device is described which includes an input sensor, a memory unit, a processing unit, and an antenna configured to wirelessly transmit and receive financial account data for a transaction. The antenna is configured to receive a request for data stored on the memory unit, and may also be configured to induce a voltage from a magnetic field to power certain components of the device. The input sensor may control whether the components can be so powered from the magnetic field. Alternatively, input from the input sensor may otherwise control the functionality of the device. By way of example, data representative of an input received by the input sensor may be transmitted in addition to the requested data.

In one set of embodiments, a mobile communications device includes a memory unit configured to store financial account information for use in a transaction and an input sensor configured to receive an input. The device also includes an antenna configured to wirelessly receive a first set of electromagnetic waves comprising a signal including a request for the financial account information to be applied to a transaction, and transmit a wireless signal responsive to the request comprising a second set of electromagnetic waves including the financial account information. The device also includes a processing unit configured to access the memory unit to retrieve the requested data and add an additional set of data to the financial account information for transmission via the wireless signal, the additional set of data representative of the received input from the input sensor.

In one embodiment, the memory unit further comprises a secure storage region, and the processing unit is configured to control access to the secure storage region based on an input received at the input sensor. The processing unit may also be configured to prevent access to the secure storage region unless a substantially concurrent input is received at the input sensor.

The input sensor may be limited to two states, and one such state may simply be a no input state. Alternatively, the input sensor may be made up of a number of input sensors, wherein different combinations of input among the sensors result in different resulting states. In another embodiment, the input sensor may be configured to receive a biometric reading or a password input. The password input may be an input received by a subset of the input sensors. The input sensors may include one or more of a dual contact point switch, a capacitance switch, a light sensor, a multi-position slide switch, or any combination thereof. The input sensor may be distinct from a keypad of the mobile communications device.

In one embodiment, the device antenna is further configured to draw power from an external source to induce a voltage for the device, and the processing unit is prevented from being powered from the external source without an input received at the input sensor. The memory unit, the input sensor, the antenna, and the processing unit may be independent from other mobile communication components of the mobile communications device.

The financial account information may be a credit card account number, a debit card account number, an ATM card account number, a stored value account number, or a bank account number. The processing unit may further be configured to encapsulate the additional set of data and the financial account information together in a single data packet for transmission via the wireless signal.

In another set of embodiments, a mobile communications device includes a means for wirelessly receiving a first set of electromagnetic waves made up of a signal including a request for financial account information to be applied to a transaction. This device also includes means for receiving an input, and means for storing data. Additionally, the device includes means for wirelessly transmitting a second set of electromagnetic waves made up of a signal including the requested financial account information from the storing means and data representative of the received input.

In one embodiment, the device further includes a processing means configured to control access to a secure storage region based on an input received at the input means. In another embodiment, the device further includes means for wirelessly drawing power from an external source to induce a voltage for the mobile communications device, wherein the means for wirelessly transmitting is prevented from being powered from the external source without a substantially concurrent input received at the input means.

In yet another set of embodiments, a mobile communications device again includes a memory unit configured to store financial account information for use in a transaction. The device also includes an antenna connected with the memory unit, and configured to wirelessly receive a first set of electromagnetic waves made up of a signal including a request for the financial account information to be applied to a transaction. The antenna is further configured to transmit a wireless signal responsive to the request, the wireless signal made up of a second set of electromagnetic waves including the financial account information. An input sensor is connected with the memory unit and configured to receive an input, wherein the requested information is prevented from being transmitted unless a first input is substantially concurrent with the receipt of the request.

In one embodiment, a processing unit is connected with the memory unit, and configured to allow access to an unsecured storage region of the memory unit regardless of the received first input. The memory unit may also have an additional secure storage region, and the processing unit may be configured to control access to the additional secure storage region based on a second input received at the input sensor. In another embodiment, a processing unit is connected with the input sensor, and configured to receive the first input from the input sensor and control, based at least in part on the received first input, whether the requested data stored on the memory unit is transmitted. In yet another embodiment, the antenna is an inductively coupled transponder configured to induce a voltage from a magnetic field to power the presentation instrument, and the received first input determines whether the processing unit may be powered from the magnetic field.

The input sensor may be limited to two states. One state may simply be a no input state. Alternatively, the input sensor may be made up of a number of input sensors, wherein different combinations of input among the sensors result in different states. The input sensors may include one or more of a dual contact point switch, a capacitance switch, a light sensor, a multi-position slide switch, or any combination thereof. The input sensor may be distinct from a keypad of the mobile communications device.

In still another embodiment, a mobile communications device includes means for wirelessly drawing power from a source external to the mobile communications device to produce a voltage. The device also includes means for wirelessly receiving a first set of electromagnetic waves made up of a signal including a request for the financial account information to be applied to a transaction, and means for processing the received request. The device further includes means for wirelessly transmitting a second set of electromagnetic waves comprising a responsive signal, as well as means for receiving an input. The input may control whether the drawing means is able to wirelessly draw power from the external source to produce a voltage for the processing means.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION OF THE INVENTION

This description provides exemplary embodiments only, and is not intended to limit the scope, applicability or configuration of the invention. Rather, the ensuing description will provide those skilled in the art with an enabling description for implementing embodiments of the invention. Various changes may be made in the function and arrangement of elements without departing from the spirit and scope of the invention as set forth in the appended claims.

Thus, various embodiments may omit, substitute, or add various procedures or components as appropriate. For instance, it should be appreciated that in alternative embodiments, the methods may be performed in an order different than that described, and that various steps may be added, omitted or combined. Also, features described with respect to certain embodiments may be combined in various other embodiments. Different aspects and elements of the embodiments may be combined in a similar manner.

It should also be appreciated that the following devices and systems may be a component of a larger system, wherein other procedures may take precedence over or otherwise modify their application. Also, a number of steps may be required before, after, or concurrently with the following embodiments.

In various embodiments, a mobile communications device is described which includes an input sensor, a memory unit, a processing unit, and an antenna configured to wirelessly transmit and receive financial account data for a transaction. The antenna is configured to receive a request for data stored on the memory unit, and may also be configured to induce a voltage from a magnetic field to power certain components of the device. The input sensor may control whether the components can be so powered from the magnetic field. Alternatively, input from the input sensor may otherwise control the functionality of the device. By way of example, an input received by the input sensor may be transmitted in addition to the requested data.

Figure 1A:
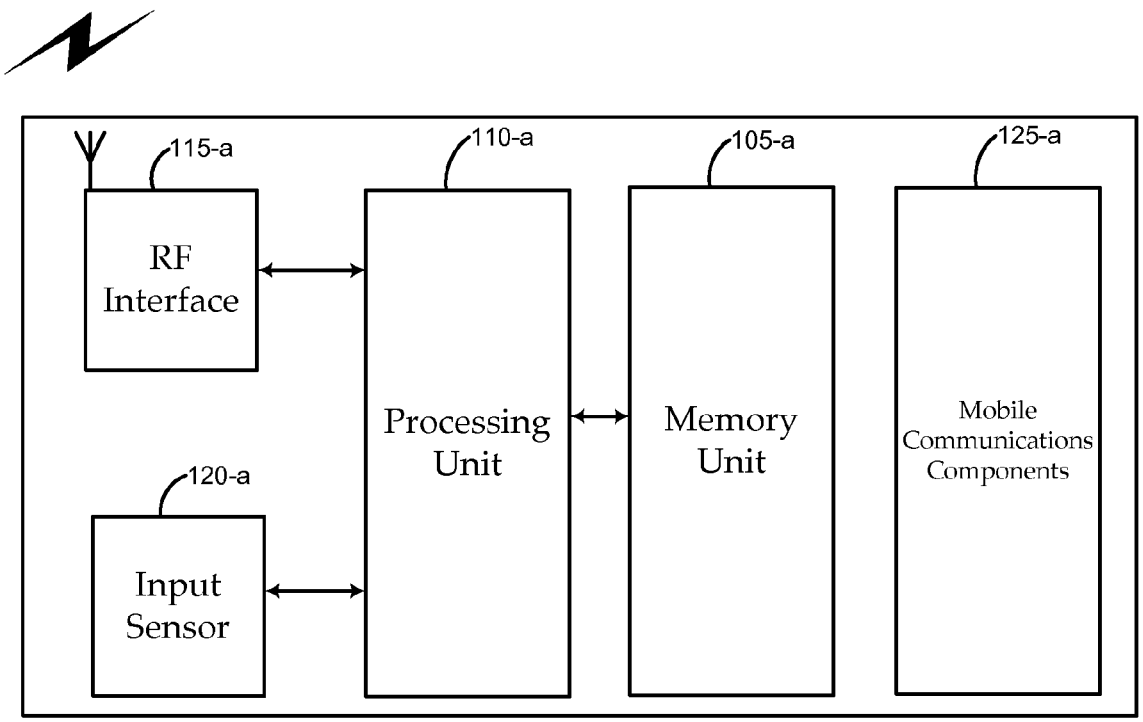
FIGS. 1A-1C are simplified block diagrams each illustrating a mobile communications device with an input sensor configured according to various embodiments of the present invention.

FIG. 1A is an exemplary embodiment of the invention illustrating a mobile communications device 100 with an input sensor 120-a. As used herein, the term "mobile communications device" is intended to include any device, such as a cellular telephone, a personal digital assistant, a pager, a text messaging device, a laptop, a portable music player, a two way radio, or other device that wirelessly communicates voice or data information.

In one embodiment, the mobile communications device 100 includes a memory unit 105-a for temporary, or more permanent, storage of information. The memory unit 105-a may be any computer readable medium, including read only memory (ROM), random access memory (RAM), magnetic RAM, core memory, magnetic disk storage media, optical storage media, flash memory devices or other machine readable media for storing information. The memory unit 105-a may, therefore, be read-only or there may be read and write capabilities. The memory unit 105-a may be a magnetic stripe that is adapted to store information. It could also be any readable RF identification, computer chip, or other magnetic, radio frequency, or electronic storage media.

There is a variety of information that may be stored in the memory unit 105-a. For example, there may be a card number associated with a credit card account number, a debit card account number, an ATM card account number, a stored value account number, or a bank account number. These may include conventional debit cards and credit cards, e.g., ATM cards, bank cards, including those associated with VISA®, Mastercard®, American Express®, etc. In some cases, the mobile communications device 100 will have identification number, and may be tracked through one or more separate account numbers at a host computer system. This scenario permits multiple cards to be tied to the same account, and multiple accounts to be tied to a single mobile communications device 100. However, it will be appreciated that the card number and the account number could be the same number. Alternatively, by way of example, the card number and the account number may be different, and may contain 16 characters so as to have the same format as traditional credit/debit cards. There may be additional information stored on the memory unit 105-a, as well, such as personal information (e.g., address, social security number, phone number), transaction or credit history, recorded use of the input sensor, passwords, authentication and encryption software, access identification information, or any additional information. The data stored on the card may be encrypted.

The financial account number may be used for purposes of funding a transaction. Examples of transactions include credit transactions, debit transactions, ACH transactions, stored-value transactions, and the like. Credit transactions include those transactions in which a financial institution provides funds on behalf of a first party in accordance with a credit agreement. Many individuals may have multiple credit arrangements with different financial institutions or even with the same institution, and more than one of these accounts may be associated with mobile communications device 100. Debit transactions include those transactions in which funds are transferred from a financial account of the first party automatically in response to the transaction. Many individuals may also have multiple debit arrangements with the same or different financial institutions, and one or more these arrangements may be associated with the mobile communications device 100. ACH transactions include those transactions that make use of the Automated Clearing House, including a variety of electronic-check or other electronic-commerce payments. Stored-value transactions include those transactions in which a prepaid amount is associated with a presentation instrument, and in which execution of the transaction results in a reduction of the prepaid amount in accordance with the amount of the transaction.

Use of the information stored on the memory unit 105-a is not limited, however, to use in financial transactions. For example, the mobile communications device 100 may be used as an access "card" to a secure entrance to a building, facility, or other area. Thus, while the examples below often refer to use during a financial transaction, the mobile communications device configuration may be used for access to a secure building, facility, or other area, or other purposes, as well. For example, just as decisions about a financial transaction may be made based on certain inputs/states, so may decisions regarding such access, as evident to those skilled in the art.

The mobile communications device 100 also includes a processing unit 110-a, communicatively connected with the memory unit 105-a and input sensor 120-a. The processing unit 110-a may be an Application Specific Integrated Circuit (ASIC), or a general purpose processor adapted to perform the applicable functions. Alternatively, the functions of the mobile communications device 100 may be performed by one or more other processing units (or cores), on one or more integrated circuits. In other embodiments, other types of integrated circuits may be used (e.g., Structured/Platform ASICs, Field Programmable Gate Arrays (FPGAs) and other Semi-Custom ICs), which may be programmed in any manner known in the art. The processing unit may be programmed to access the memory unit 105-a. It may fetch instructions and other data from the memory unit 105-a, or write data to the memory-unit 105-a. The processing unit may be enclosed in a chip module, in any manner known in the art. The processing unit 110-a may include one or more processors to perform cryptographic functions, error detection or correction, data transfer, clock functions, memory management, and so on.

The processing unit 110-a is communicatively connected to a wireless interface. In this exemplary embodiment, an RF interface 115-a is configured to transmit and receive electromagnetic waves comprising a wireless signal. Data may be transferred from a terminal (e.g., a point-of-sale device, smart card reader, etc.) to the mobile communications device 100, and from the memory unit 105-a to a terminal. Any known modulation techniques may be used (e.g., AM, ASK, PSK, QPSK, etc.). The interface may, in different embodiments, be any radio or microwave link, optical link, inductive coupling, or other wireless means known in the art. The RF interface 115-a may be the interface for energy transfer as well (e.g., a magnetic field may power a card via inductive coupling). As will be discussed later, the wireless power source may be the only source of power for the processing unit 110-a and memory unit 105-a. In another embodiment, there may be an additional power source (e.g., a battery, possibly rechargeable via the wireless interface, independent from the mobile communications components), as well. In still other embodiments, the power source may be a battery for the mobile communication components 125-a of the device 100.

As briefly referenced above, the mobile communications device 100 also includes additional mobile communications components 125-a. These components 125-a may include a keypad, liquid crystal display ("LCD") or other display, battery, radio frequency ("RF") transmit and receive components, processing unit (e.g., digital signal processor ("DSP")), memory, and additional communication components. As used herein, these mobile communication components may function to communicate with a base station to provide cellular connectivity via time division multiple access ("TDMA") systems, code division multiple access ("CDMA") systems, and Global System for Mobile communications ("GSM") systems. Other exemplary cellular systems include systems known in the art as "3G" systems, Enhanced Data Rates for GSM Evolution ("EDGE") systems. These components may also function to transmit and receive data via WiFi hot spots (e.g., IEEE 802.11 standards, including but not limited to IEEE 802.11(a), IEEE 802.11(b), IEEE 802.11(g), and IEEE 802.11(n)).

In the embodiment illustrated in FIG. 1A, the mobile communications components 125-a are independent from the processing unit 110-a, memory unit 105-a, input sensor 120-a, and RF Interface 115-a. Although each set of components are integrated into the device, for example, each set of components may be physically separate. Note that in other embodiments, discussed below, individual components may be integrated to serve a number of functions. Each set of components may be functionally independent, regardless of the extent to which they are integrated As noted above, the processing unit 110-a is communicatively connected with an input sensor 120-a. The input sensor 120-a may be any sensing or input unit, a selection of which will be discussed below. However, it is worth noting that the following description is for exemplary purposes only, and is in no way intended to limit the different possible input sensors that may be employed.

In one embodiment, the input sensor 120-a controls whether the processing unit 110-a may be powered from the magnetic field. In this exemplary embodiment, assume that the processing unit 110-a is powered wirelessly via inductive coupling. The input sensor 120-a in one embodiment is a dual contact point interface, coupled with the processing unit 110-a through an I/O interface. The operation has two states, a first state allowing the processing unit 110-a and memory unit 105-a to be powered via inductive coupling, and a second state preventing the components from being so powered. The switch could be implemented in a variety of ways. For example, it could be implemented by monitoring the resistance between the contact pads, and interpreting a less than infinite resistance as the ON (i.e., CLOSED) position. The actual interface could be configured to allow the placement of a user's finger across the contacts as the method of bridging the contacts, activating the switch to the ON position. The switch would remain in the OFF (i.e., OPEN) position when the contacts are not closed, thereby preventing the processing unit 110-a from being powered. Thus, the device may be thereby configured to prevent data from being transmitted unless an input is substantially concurrent with the wireless receipt of a request for information.

Figure 1B:
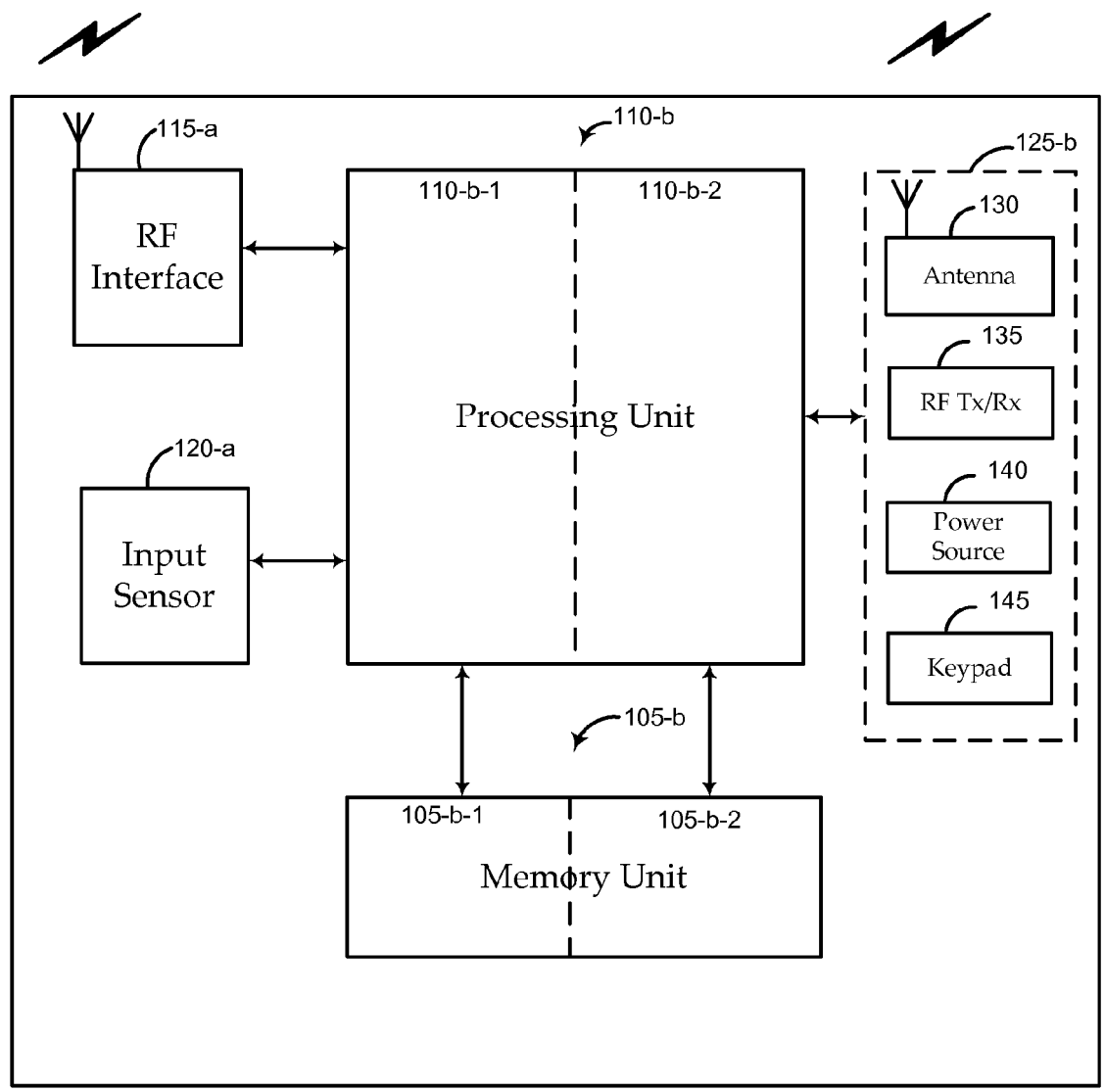

FIG. 1B is a block diagram illustrating an example of a mobile communications device 150 in which certain components serve multiple functions. In this embodiment, the device 150 includes a RF interface 115-a and input sensor 120-a, which may be configured as described with reference to the device 100 of FIG. 1A. Independent of these components, the device 150 of FIG. 1B also includes mobile communications components 125-b. These components 125-b may include an antenna 130, radio frequency ("RF") transmit and receive components 135, power source 140 (e.g., a battery), and keypad 145, physically separate and functionally independent from the RF interface 115-a and input sensor 120-a.

This example device 150 also includes a processing unit 110-b and memory unit 105-b. In this device 150, the processing unit 110-b serves at least two functions. At least part of the processing unit 110-b-1 provides the functionality of the processing unit 110-a described with reference to FIG. 1A. At least part of the processing unit 110-b-2 provides processing functionality attributable to mobile communications (e.g., providing cellular connectivity via time division multiple access ("TDMA") systems, code division multiple access ("CDMA") systems, and Global System for Mobile communications ("GSM") systems, etc.).

Similarly, the memory unit 105-b of this device 150 serves at least two functions. At least part of the memory unit 105-b-1 provides the functionality of the memory unit 105-a described with reference to FIG. 1A. At least part of the memory unit 105-b-2 provides storage functionality attributable to mobile communications. Thus, this embodiment illustrates that while components may be separate, the mobile communications and presentation instrument functionality described above may each be performed with the same set of components providing the functionality.

Figure 1C:
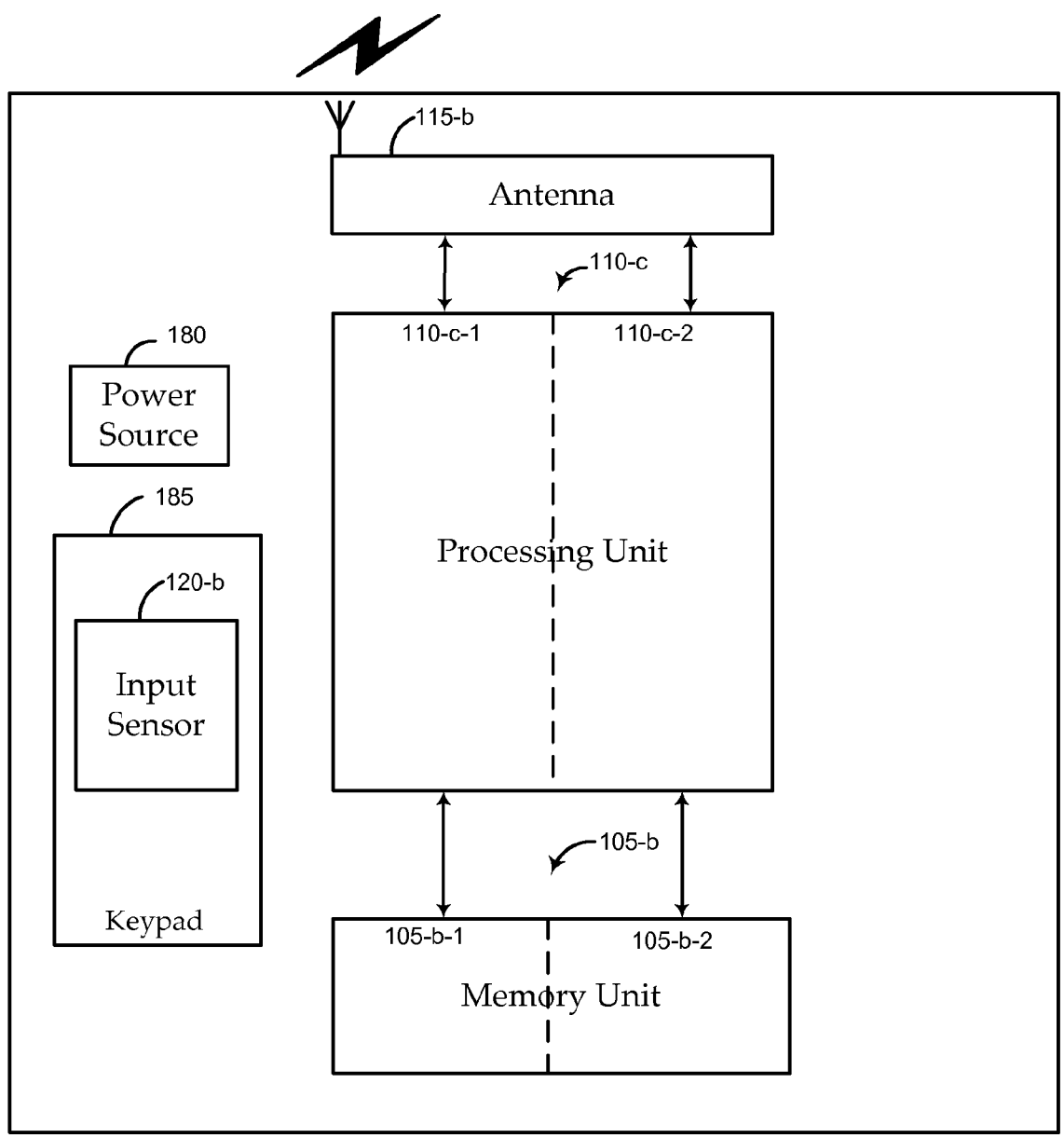

FIG. 1C is a block diagram illustrating an example of a mobile communications device 175 in which the functionality of additional components are integrated. In this embodiment, the device 175 includes an antenna 115-b that serves at least two functions. At least part of the antenna 115-b provides the functionality of the RF interface 115-a described with reference to FIG. 1A. At least part of the antenna 115-b provides functionality attributable to mobile communications (e.g., providing cellular connectivity via time division multiple access ("TDMA") systems, code division multiple access ("CDMA") systems, and Global System for Mobile communications ("GSM") systems, etc.), like the antenna 130 of FIG. 1B.

This example device 175 also includes a processing unit 110-c and memory unit 105-c. In this device 175, the processing unit 110-c serves at least two functions. At least part of the processing unit 110-c-1 provides the functionality of the processing unit 110-a described with reference to FIG. 1A. At least part of the processing unit 110-c-2 provides processing functionality attributable to mobile communications. Similarly, the memory unit 105-c serves at least two functions. At least part of the memory unit 105-c-1 provides the functionality of the memory unit 105-a described with reference to FIG. 1A. At least part of the memory unit 105-c-2 provides storage functionality attributable to mobile communications. The processing unit 110-c is communicatively connected with both the antenna 115-b and memory unit 105-c.

The device 175 also includes a power source 180 (e.g., a battery) configured to power the processing unit 110-c and memory unit 105-c. The device 175 also includes a keypad 185, configured to provide keypad functionality for mobile communications purposes. An input sensor 120-b is integrated into the keypad 185 to provide at least some of the functionality of the input sensor 120-a described with reference to FIG. 1A. FIGS. 1A-1C illustrate how the functions described herein may be performed by separate components, or how different component functionality may be integrated. There are a number of ways that different components may be integrated, and this disclosure in no way limits such integration, instead providing examples to illustrate selected options.

Figure 2A:
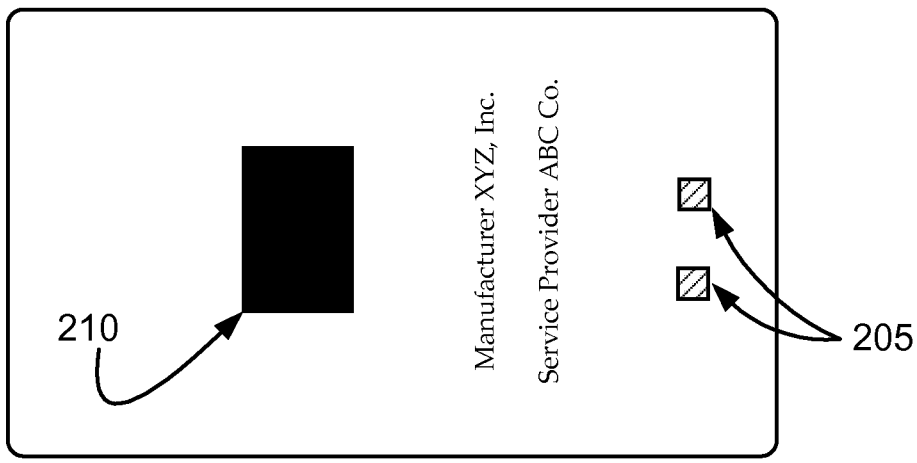
FIG. 2A is a back view of a mobile communications device according to one embodiment of the invention.

Turning to FIG. 2A, an example of a back view of a mobile communications device 200 (such as the device 100 of FIG. 1A) is illustrated. The two contact points 205 (which are input sensors in this embodiment) are shown on the back of a mobile communications device 200 (e.g., a phone or PDA), although different forms of packaging and sizes may be employed in other embodiments. The processing unit and memory unit are included in the chip module 210. In this embodiment, the processing unit and memory unit (e.g., the processing unit 110 and memory unit 105 of FIGS. 1A-1C) are included in the chip module 210 and are independent from the mobile communications components (as are the contact points 205). Note, however, that in other embodiments, these and other components may be integrated in various degrees into the mobile communications components.

Figure 2B:
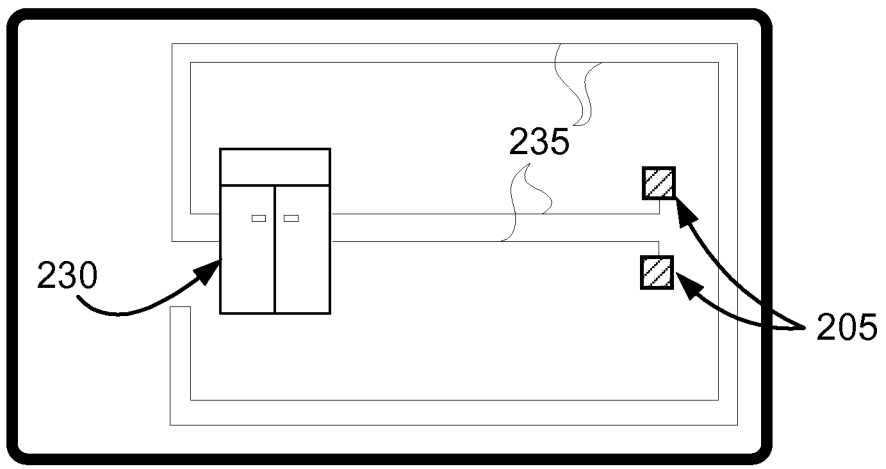
FIG. 2B is a block diagram of certain components of the mobile communications device illustrated in FIG. 2A.

In FIG. 2B, a block diagram 220 illustrating a selection of electronic components found, for example, on the mobile communications device 200 of FIG. 2A is shown. The contact pads 205 are each connected with the processing unit 230 via conductors 235. The OPEN state may be configured to limit or control the wireless reception of power via the RF interface (e.g., the RF interface 115-*a* of FIGS. 1A or 1B). Alternatively, the OPEN state could otherwise prevent the processing unit or memory unit (e.g., the processing unit 110 or memory unit 105 of FIGS. 1A-1C) from being powered. Thus, there are a variety of configurations which could prevent or otherwise limit the functionality and operation of components of the mobile communications device until the contacts 205 are in a CLOSED state. Moreover, in some embodiments, when the contacts are CLOSED, the applicable components of the mobile communications device 200 may be configured to remain functional for an additional period of time (e.g., 1, 2, 5 or 10 seconds) once the contacts are reopened.

In another embodiment, the contact pads 205 of the mobile communications device 200 are again configured to operate in the two states, OPEN or CLOSED. However, instead of limiting the power or functionality of the mobile communications device 220, they are configured to communicate their state to the processing unit 230. The processing unit 230, in this embodiment, is configured to include this state information with the requested data (e.g., account information). For example, assume a transaction in which a 16 digit account number stored on the mobile communications device 200 is requested. Instead of transmitting only the account number, state information is transferred as well. This state information could simply be an additional binary output at the end of the account number (perhaps transmitted together as a single data packet). Alternatively, the state information could be included in any manner known in the art.

Embodiments of the invention are not, however, limited to the two contact pad implementations discussed above. Turning back to FIG. 5A, for example, an input sensor 120-*a* may be a two-state capacitance switch (e.g., a touch switch) implemented to use the capacitance of the human body as a switching method. When the mobile communications device 100 is powered (e.g., via inductive coupling), the capacitance switch is queried, and based upon the capacitance level the processing unit could infer the activation or deactivation (ON/OFF) state of the switch.

In another embodiment, an input sensor is a pressure switch, which effectively operates in the same manner as the two-state switching devices described above. The difference is in the physical switching device. The pressure switch may be covered with a flexible membrane that would protect the actual switching component, with all other operations similar to the two state devices described above.

In still other embodiments, the input sensor may be a more traditional "slide type" switch, that would allow the user to physically switch the operational state of the mobile communications device. This implementation differs from the above implementations in that it allows a user to make a setting that controls the chip function, until the switch is changed. The slide switch could be implemented as a two-state switch, as described above. Alternatively, there could be three positions for the slide switch with, for example, one setting for "off," one setting for "on," and a third setting to indicate approval of a purchase. Other settings are possible, as well, as evident to those skilled in the art.

Figure 2C:
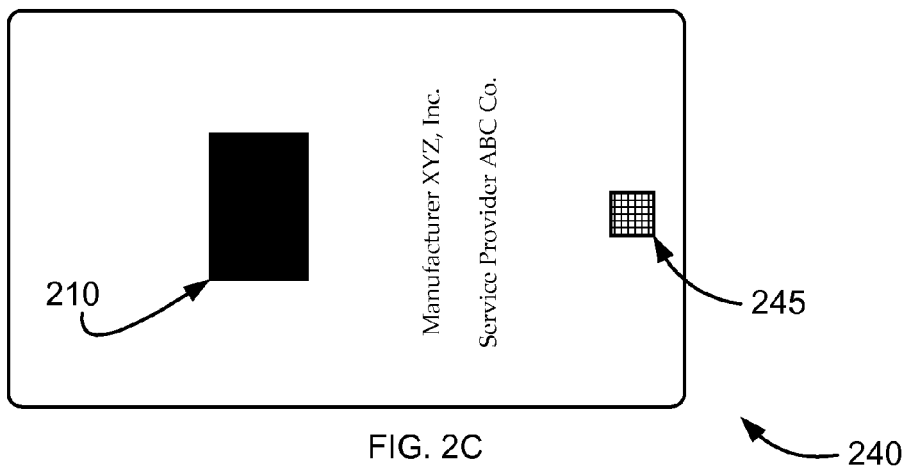
FIGS. 2C-2E comprise the back views of a mobile communications device configured according to various embodiments of the invention.

In the embodiments above a user typically provides the input, but that need not be the case. Turning to FIG. 2C, for example, a mobile communications device 240 is illustrated where the input sensor is a light sensor 245. This may, for example, be the mobile communications device 100 or 150 of FIGS. 1A or 1B. The light sensor may be any light sensing device known in the art, from, for example, the most basic light sensing device to an image sensor array. The light sensor could also function as a mechanism to power the processing unit in the chip module 210 of the mobile communications device 240 (e.g., a solar/light powered unit). The light sensor 245 may be implemented as a two-state sensor, wherein placement of the mobile communications device 240 in a dark space (e.g., a purse or pocket) deactivates the functionality of certain components of the mobile communications device 240. In this embodiment, the light sensor 245 is connected to the processing unit in the chip module 210, again via an I/O interface. The light sensor 245 could thus be configured to deactivate the functions of the RF interface or processing unit when the light level drops below a set level. Alternatively, in another embodiment, the processing unit of the chip module 210 reads or otherwise receives two-state information regarding the light level, and this information is included when, for example, an account number is transmitted for the mobile communications device. In yet another embodiment, the processing unit 210 reads or otherwise receives information regarding the light level within a multitude of ranges, and transmits the reading or range. Thus, the input from the light sensor 245 can also operate by providing a quantitative value to the I/O interface to provide a real time indication of the level of illumination. Thus, while in some embodiments the input sensor is a two-state device, in other embodiments the input sensor may have three or more states.

Figure 2D:
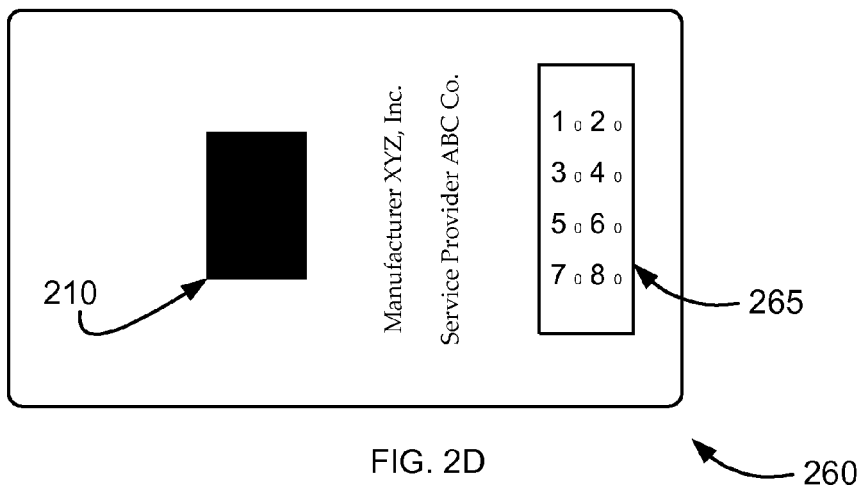

Turning to FIG. 2D, an exemplary mobile communications device 260 is illustrated where the input sensor is connected to the chip module 210, and is made up of a set of numbered input sensors 265. In this embodiment, there are 8 individual sensors, but in other embodiments other numbers and configurations may be used. These inputs may be separate from the keypad of the device, or either partially or fully integrated therein. Each input sensor may be individually activated by the user of the device, and a variety of such input sensors are well known in the art so further technical elaboration is not necessary. The input sensors 265 may be used in a variety of ways to provide additional control over the mobile communications device 260. For example, a series of numbers may be selected in succession to allow input of a password. Alternatively, two or more numbers may be input simultaneously to make up a password input. The password input authorization information, in this embodiment, is stored on the memory unit of the mobile communications device 260, which may or may not be separate from the memory unit for other mobile communication components. With the input of the correct password, the relevant components (e.g., memory unit, processing unit. etc.) of the mobile communications device may be rendered functional. Thus, the password input could provide the two-state ON/OFF control for the chip module 210, preventing or allowing the device to transmit data such as account information.

In another embodiment, the input sensors can first function much like the contact pads. Thus, by placing a finger over two or more sensors, the mobile communications device 260 is modified to allow particular components (e.g., memory unit, processing unit etc.) to be powered wirelessly via a magnetic field, or otherwise allow functions within components (e.g., for a variable or predetermined period of time (1, 2, 10, etc.) seconds). Once the applicable components are functional, the numbered input sensors may be used to provide password or other validating input to authorize a transaction, or to access a secure region of the memory unit.

Figure 2E:
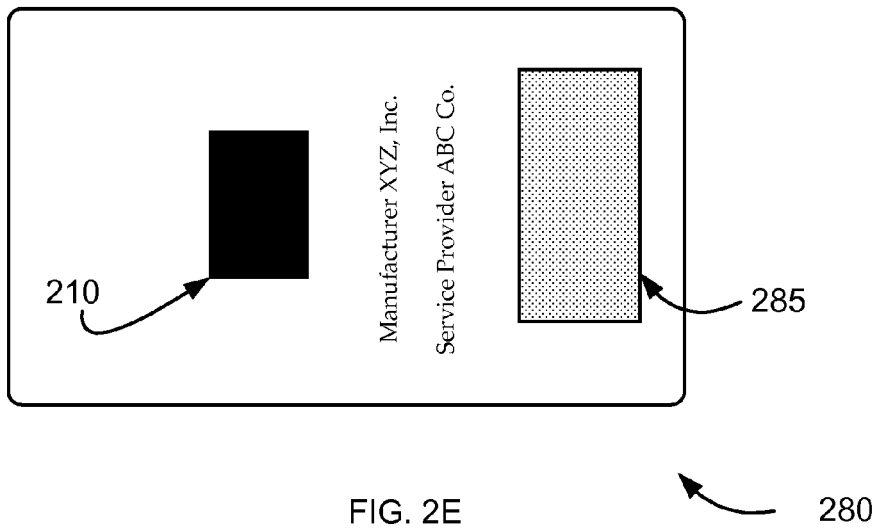

Finally, FIG. 2E illustrates an exterior view of a mobile communications device 280 including an input sensor which is a biometric measurement unit 285. In this embodiment, there is an array of sensors configured to, in effect, measure the outline of a finger placed on the measurement unit 285. In other embodiments, other types of biometric input may be used. Each input sensor of the array may be activated by, for example, pressure or light. A variety of such input sensors is well known in the art, and further elaboration is not necessary. The measurement unit 285 may be used in a variety of ways to provide additional control over the mobile communications device 280. For example, assume a measurement of the outline of a finger placed on the unit 285 is taken. The authorization information, in this embodiment, is stored on the memory unit of the mobile communications device 280. When there is a match, the mobile communications device (or components or functionality thereof) may be rendered functional. Thus, the proper biometric input could provide the two-state ON/OFF control for the mobile communications device 280, preventing or allowing the device to transmit data such as account information.

Alternatively, the measurement unit can first function much like the contact pads. Thus, by placing a finger on the measurement unit 285, the configuration of the mobile communications device 280 is modified to allow the device to be powered wirelessly via a magnetic field, or otherwise to become functional for a period of time (e.g., 5 or 10 seconds). Once the components or functionality of the mobile communications device 280 are activated, a biometric input (e.g., an outline of a finger) could be used to provide password or other validating input to authorize a transaction, or allow access to a secure region of the memory unit. The foregoing discussion of the various options for input sensors is exemplary, and should not be interpreted as limiting the various options.

Figure 3:
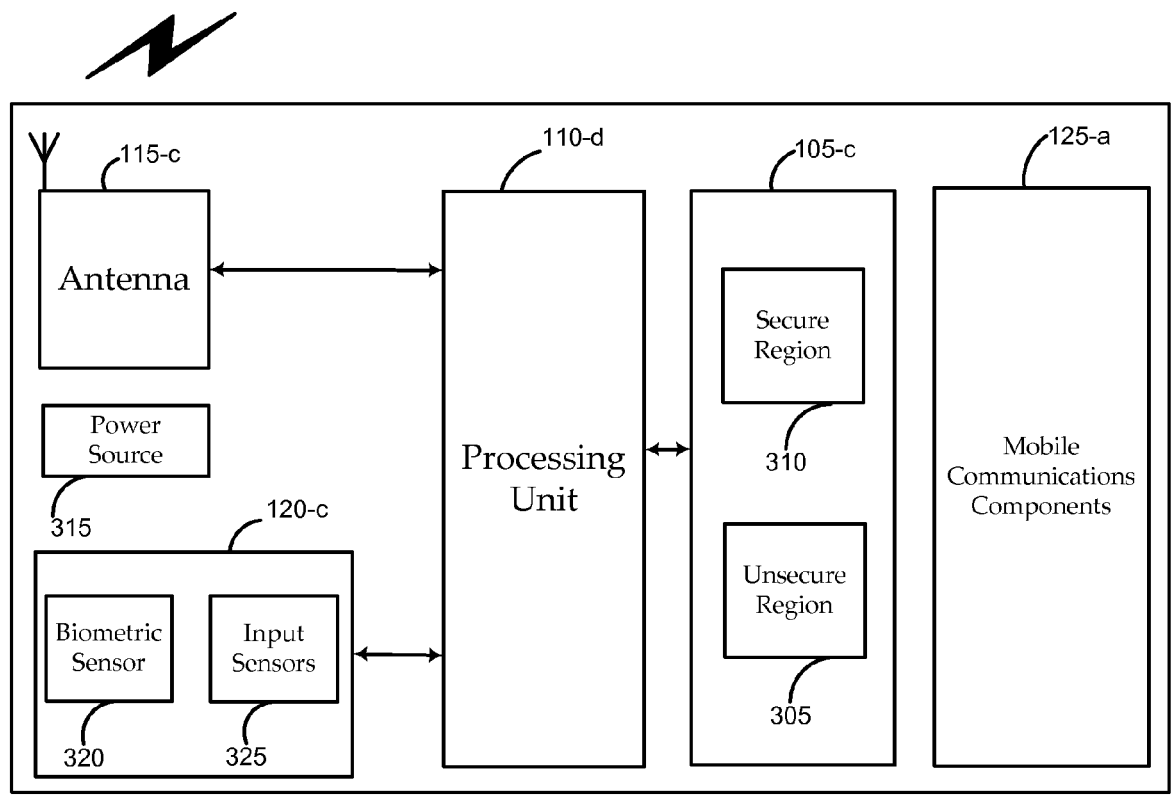
FIG. 3 is a simplified block diagram illustrating an alternative configuration of a mobile communications device with an input sensor configured according to various embodiments of the present invention.

FIG. 3 is an alternative exemplary embodiment of the invention made up of a mobile communications device 300 with a number of input sensors 120-*c*. The mobile communications device 300 may be the device 100 of FIG. 1A. Additionally, the device 300 includes a processing unit 110-*d* connected with the memory unit 105-*c*. In this exemplary embodiment, the memory unit 105-*c* includes an unsecure region 305. This unsecure region is configured to store information which is accessible to be transmitted upon request (so long as the processing unit 110-*d* and memory unit 105-*c* are functional). Thus, this information may be unencrypted. The memory unit 105-*c* also includes a secure region 310. For the secure region 310 in this embodiment, some additional input is required from the user of the card to allow access to this region (e.g., a password or biometric measurement). The remainder of the data stored on the memory unit 105-*b* is accessible, but only if requested from a source determined to be authorized to access the data (e.g., a point-of-sale device authorizing a requested transaction). The data may be encrypted or otherwise protected, but once the card is activated, the data is accessible to the authorized source (i.e., no additional user input is required). There are a variety of ways known in the art to determine whether a request from a terminal is from a trusted, or otherwise authorized, source.

The mobile communications device 300 includes an antenna 115-*c* configured to transmit and receive wireless signals, and further configured to wirelessly draw power from a source. In one embodiment, the antenna may comprise a coil, which draws power from a magnetic field via inductive coupling. In other embodiments, the antenna may be configured to draw power using other methods known in the art. The mobile communications device 300, in this embodiment, includes a separate power source 315 (e.g., a small battery). The power source 315 may be configured to power all, or only a limited number, of functions of the device. The power source 315 may comprise a rechargeable battery that is charged with power drawn from the antenna (or, alternatively, perhaps is solar/light-powered). Thus, while the input sensor 120-*c* may control whether the mobile communications device 300 (or components thereof) may be wirelessly powered, the input sensor 120-*c* may simply be configured to prevent a battery-powered mobile communications device (or components thereof) from functioning.

The mobile communications device 300 also includes additional mobile communications components 125-*a*. These components 125-*a* may include a keypad, liquid crystal display ("LCD") or other display, battery, radio frequency ("RF") transmit and receive components, processing unit (e.g., digital signal processor ("DSP")), memory, and additional communication components. The mobile communications components 125-*a* are independent from the processing unit 110-*d*, memory unit 105-*c*, input sensor 120-*c*, and antenna 115-*c*. Although each set of components are integrated into the device, for example, each set of physical components may be separate. Note that, in other embodiments, individual components may be integrated to serve a number of functions (e.g, the battery for the mobile communications components 125-*a* could serve to power certain components in lieu of the power source 315).

Turning to the input sensor 120-*c*, in this embodiment there is a biometric sensor 320 and additional input sensors 325. Thus, this embodiment illustrates how different configurations of sensors may be used in combination to provide control over the functionality of the mobile communications device 300. By way of example, the input sensors 325 may be configured to control whether the processing unit 110-*d* and memory unit 105-*c* are operational (e.g., on/off functionality), while the biometric sensor 320 may be configured to control access to data in the secure region 310.

Figure 4A:
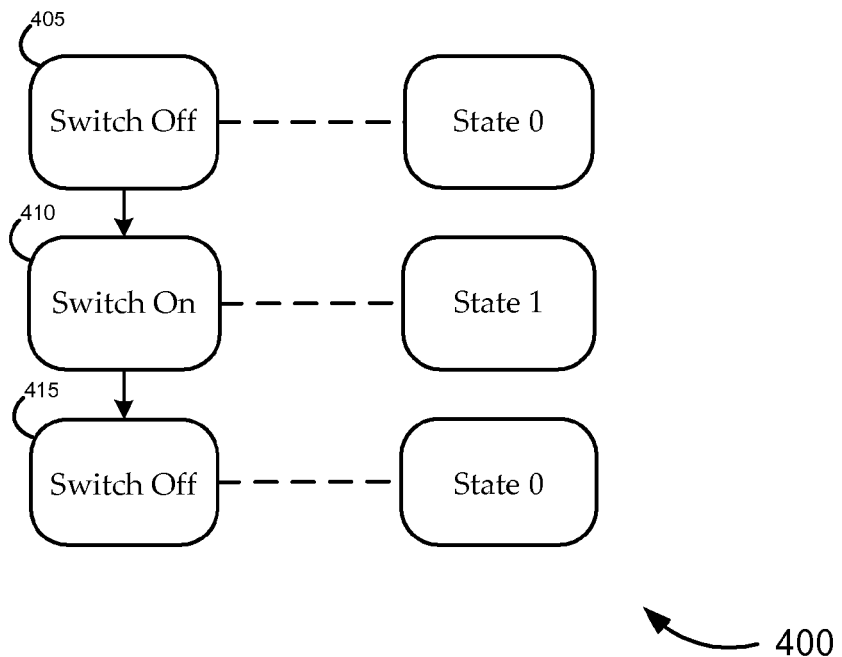
FIGS. 4A-4C contain various state diagrams applicable to the input sensors embedded in a mobile communications device configured according to various embodiments of the present invention.
Figure 4B:
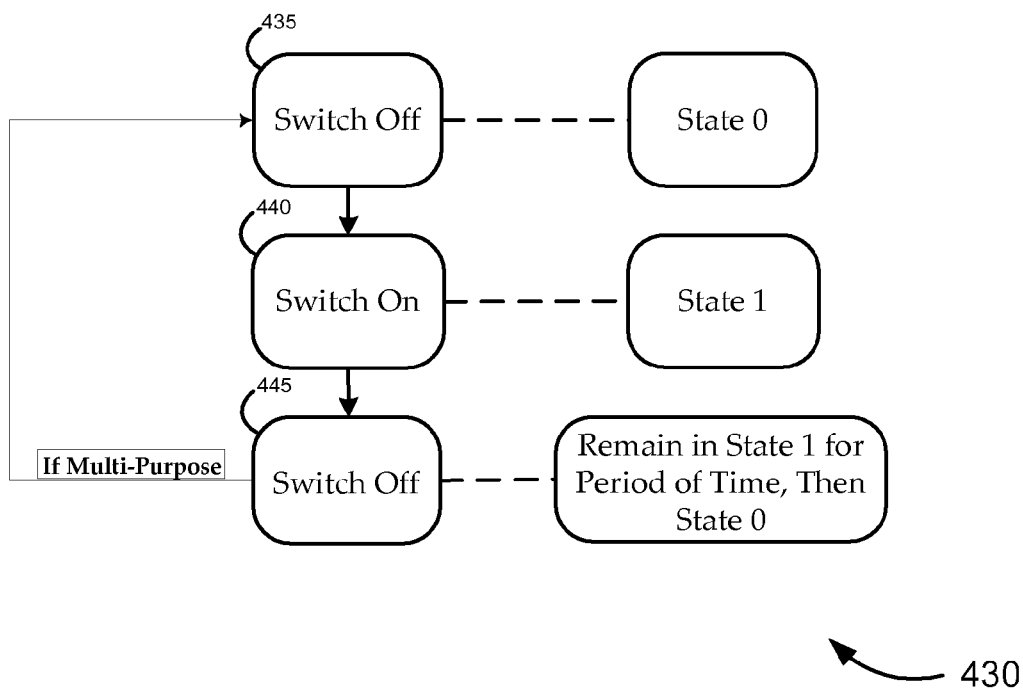
Figure 4C:
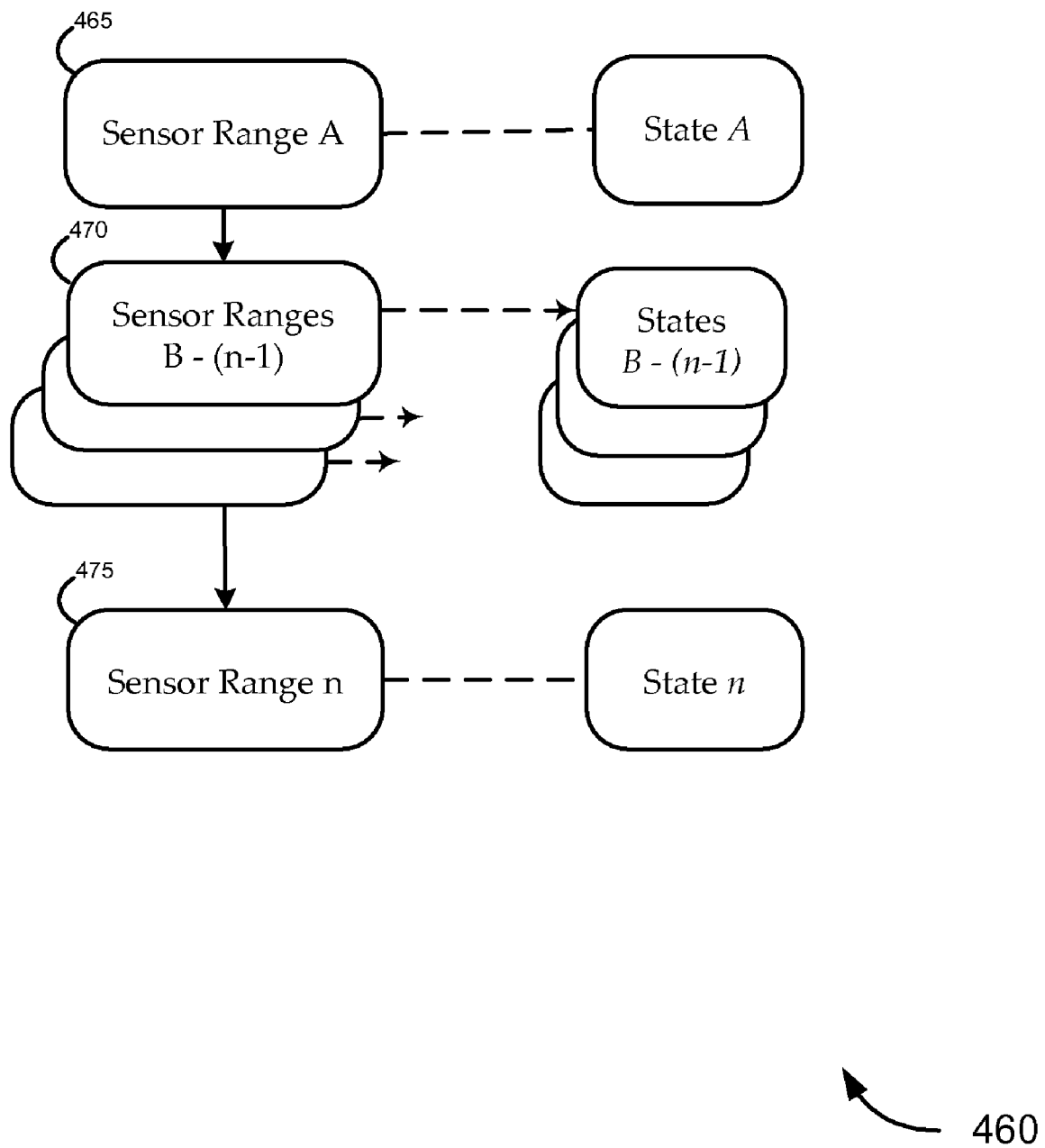

FIGS. 4A-4C depict selected options for the varying states of the input sensor. This discussion is not intended to limit the various state options, but instead is intended to illustrate the various input sensor states in different embodiments of the invention. For example, these states may be applied to selected components of the mobile communications device (100, 150, 175) of FIGS. 1A, 1B, or 1C. First, consider the state diagram 400 of FIG. 4A. In this example, assume a two-state input sensor, in which the input sensor effectively functions as a switch. When the switch is off, at block 405, the input sensor is in a first state, State 0. When the switch is turned on (e.g., via contact, pressure, light, capacitance) at block 410, the input sensor goes to a second state, State 1. In this example, as soon as the switch is turned off at block 415 (e.g., the contact, pressure, light, capacitance drops below a set level), the input sensor returns to the first state, State 0. This type of switch may be used to control the on/off functionality of one or more of the components of a mobile communications device (and also append state information data). Thus, the switch may be configured to prevent the operation of the processing unit or memory unit in State 0, while enabling operation in State 1. Alternatively, the State (0 or 1) could be transmitted with the requested account information.

Next, consider the state diagram 430 of FIG. 4B. In this example, again assume a two-state input sensor, the input sensor effectively acting as a switch. When the switch is off, at block 435, the input sensor is in a first state, State 0. When the switch is turned on (e.g., via contact, pressure, light, capacitance) at block 440, the input sensor goes to a second state, State 1. In this example, when the switch is turned off at block 445 (e.g., the contact, pressure, light, capacitance drops below a set level), the input sensor returns to the first state, State 0, after a set period of time (e.g., 5, 10, or 60 seconds). This type of switch may be used to control the on/off functionality of one or more of the components of a mobile communications device. For example, the switch may be configured to prevent the operation of the presentation instrument in State 0, while enabling operation in State 1. Also, the State (0 or 1) could be transmitted with the requested account information.

Furthermore, the switch could be a multi-purpose two-state switch. For example, assume the applicable components of the mobile communications device are not functional, as the switch is off, at block 435. When the switch is turned on (e.g., via contact, pressure, light, capacitance) at block 440, the input sensor goes to a second state, State 1. In this example, when the switch is turned off at block 445 (e.g., the contact, pressure, light, capacitance drops below a set level), the applicable components remain functional for a period of time. If the switch is turned on again (e.g., via contact, pressure, light, capacitance) during that operational time period, the switch functions to provide state information for transmission with the requested account information. Thus, a single two-state switch may thereby be configured to 1) provide protection against snooping, and 2) confirm that the mobile communications device is possessed by a purchaser.

Finally, consider the state diagram 460 of FIG. 4C. In this example, assume a multi-state input sensor, wherein different combinations of input result in different states. For example, there could be various numbered or other configurations of sensors. Different combinations of input, received either concurrently or successively, result in different input sensor states. Sometimes, a range of inputs will all result in a particular sensor state. For purposes of discussion, therefore, the term "range" will be used, but it is worth noting that a range may simply comprise a given combination of inputs. Turning to the exemplary embodiment illustrated in FIG. 4C, any sensor input in Range A, at block 465, results in State A. Similarly, at blocks 470 and 475, each distinct range of inputs, Range B-Range n, results in a different State. This type of switch may be used to control the functionality of applicable components of the mobile communications device. For example, the input sensor may be configured to prevent certain functionality of the processing unit in State A (e.g., no input), while enabling operation in all other states. Alternatively, additional protection may be provided by rendering the processing unit or certain functions performed therein available only if certain passwords, biometric measurements, or other combinations of inputs (i.e., Sensor Ranges) match data stored in the memory unit. Moreover, there could be different levels of security (i.e., any input renders processing unit and memory unit functional, while only certain ranges of input allow access to a secure region of the memory unit).

Figure 5:
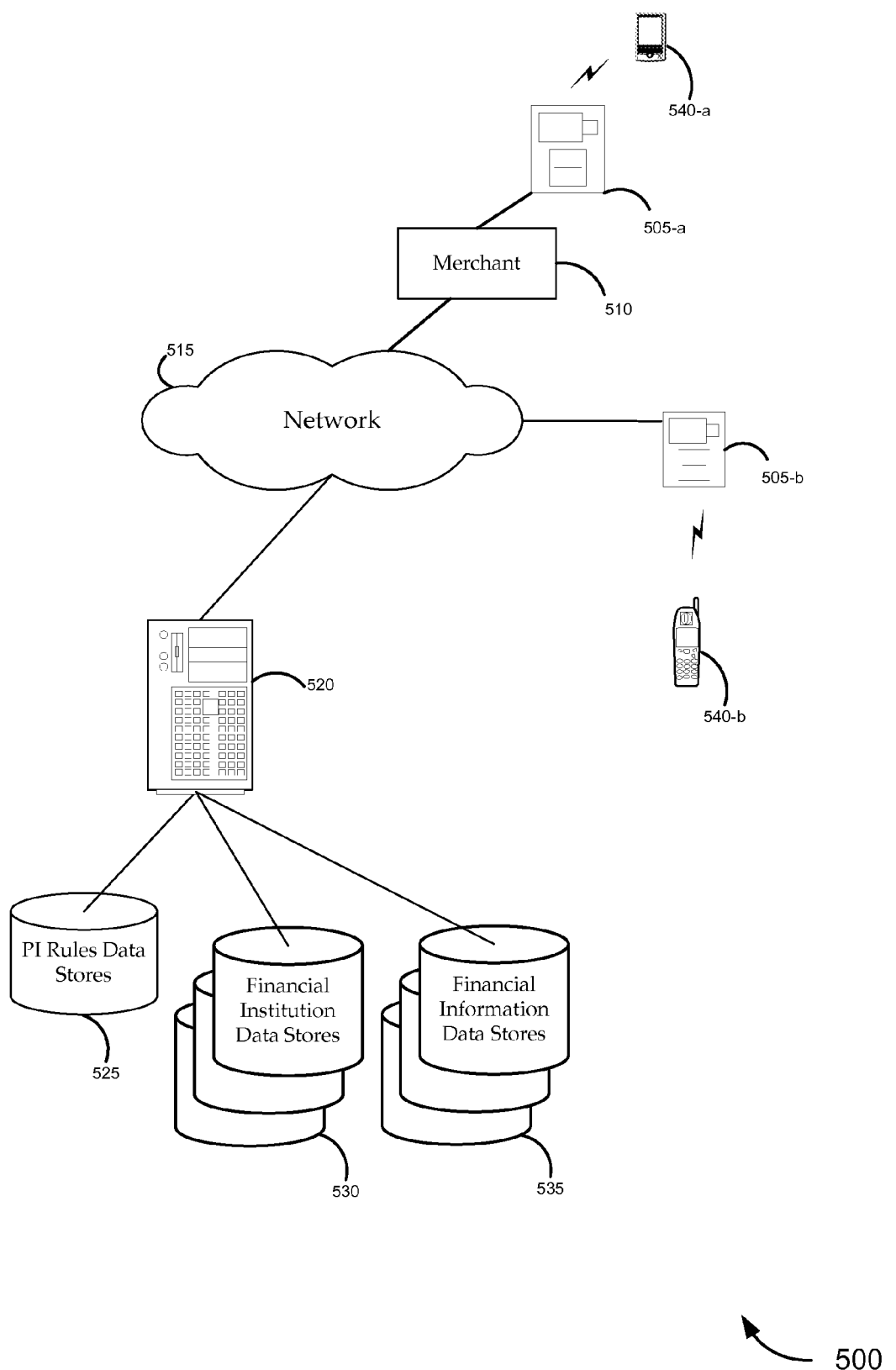
FIG. 5 is a diagram of a system for processing information and input from a mobile communications device configured according to various embodiments of the present invention.

FIG. 5 illustrates an exemplary system 500 within which various embodiments of the invention may operate. The components of such a system may be directly connected, or may be connected via a network 515, which may be any combination of the following: the Internet, an IP network, an intranet, a wide-area network ("WAN"), a local-area network ("LAN"), a virtual private network, the Public Switched Telephone Network ("PSTN"), or any other type of network supporting data communication between devices described herein, in different embodiments. A network 515 may include both wired and wireless connections, including optical links. Many other examples are possible and apparent to those skilled in the art in light of this disclosure. In the discussion herein, a network 515 may or may not be noted specifically. If no specific means of connection is noted, it may be assumed that the link, communication or other connection between devices may be via a network 515.

According to various embodiments of the invention, the system 500 includes a host computer system 520. The host computer system 520 may include, for example, one or more server computers, personal computers, workstations, web servers, or other suitable computing devices. The host computer system 520 may be fully located within a single facility or distributed geographically, in which case a network 515, as described above, may be used to integrate different components.

The host computer system 520 may be in communication with one or more databases or other data stores, such as PI rules data store 525, financial institution data stores 530, and financial information data stores 535. According to different embodiments of the invention, each data store may include any number of tables and sets of tables. In addition, these data stores may be a single database. Application software running on the host computer system 520 may query the applicable data stores, and produce decisions as dictated by the application software. Each may be incorporated, in whole or in part, within the host computer system 520 (e.g., within its storage media), or may be a part of a separate system associated with the host computer system 520. Each may be fully located within a single facility, or distributed geographically. Each data store may be organized in any manner different than described above to provide the functionality called for by the various embodiments, as known by those skilled in the art.

The host computer system 520 is in communication, directly of indirectly, with the terminals 505 that communicate directly with the mobile communications devices 540 configured according to various embodiments of the invention. A device 540 may, for example, be a mobile communications device (100, 150, 175) of FIGS. 1A, 1B, or 1C. A terminal 505 may be operated by a merchant 510, or may be independent of a merchant. A terminal 505 may be a point-of-sale device, a scanner, a smart card reader, or any other interface that provides the data connectivity with a device 540. Often, the terminal 505 also provides the magnetic field or other source to wirelessly power the applicable components of the device 540 to initiate transmission of account information to complete a transaction.

By way of example, a terminal 505 requests transaction data (e.g., account information) from a mobile communications device 540 for purposes of authorizing and completing a transaction. The device 540 transmits the data related to the transaction, which may include any selection from the group consisting of a location, merchant, time, amount, or stock keeping unit (SKU) number. Also, the device 540 may include additional data regarding the state of the input sensor (whether it be a two-state sensor, or a sensor that has additional states). This set of data is received by the host computer system 520.

The host computer system 520 receives the set of data related to the transaction, and accesses the PI rules data stores 525 to determine the handling of the transaction. The PI rules data stores 525 includes rules for processing the data received to identify one or more of a number of different outputs. Some of the rules relate to the approval or denial of a transaction based at least in part on the data representative of the state of the input sensor. Other rules may relate to factoring a credit account balance, available credit, credit history, etc. of the holder of the account at issue, or other responsible party. Therefore, the host computer system 520 may also query the financial institution data stores 530 (e.g., to get balance or other account information) and financial information data stores 535 (e.g., to get credit ratings or history), and may apply this information to the rules as well. The host computer system 520 processes the received set of data by applying the set of data to the rules.

The host computer system 520 is then configured to transmit a responsive output. If transaction data and the data defining the state of the input sensor are both received, the host computer system 520 may authorize or deny the transaction based on the application of the rules. The outcome, in some instances, is based at least in part on the data representative of the state of the input sensor. If only the transaction data is received (with no data defining the state of the input sensor), the rules may include one or more outputs directing reuse of the presentation instrument with a valid user input (i.e., with proper state information).

Figure 6:
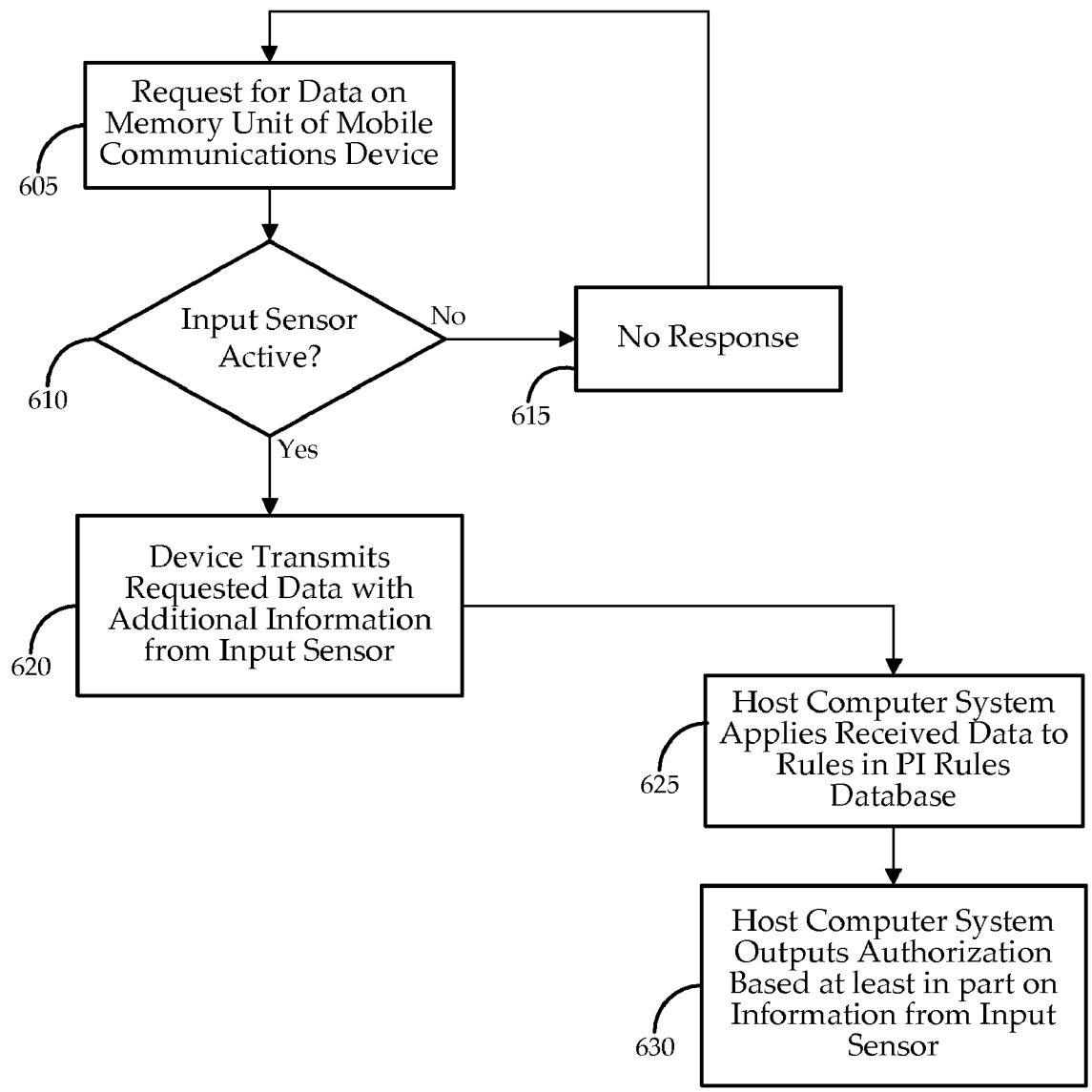
FIG. 6 illustrates a method for processing information and input from a mobile communications device configured according to various embodiments of the present invention.

FIG. 6 sets forth an exemplary embodiment 600 of the invention, illustrating a method of processing a transaction with a mobile communications device. The method may, for example, be performed by the mobile communications device (100, 150, 175) of FIGS. 1A, 1B, or 1C in communication with a host computer system 520 of FIG. 5. At block 605, a request for data (e.g., account number data) is transmitted. The requested data may be located, for example, on the memory unit of a mobile communications device. At block 610, an input sensor (e.g., on the device) will be in one of two state states: active (i.e., above a threshold level of contact, pressure, light, capacitance, etc.), or not active (below a threshold level of contact, pressure, light, capacitance, etc.). At block 615, if the input sensor is not active, there will be no response because the non-active state renders the applicable components not functional or not operational. However, if, as at block 620, the input sensor is active, the requested data (e.g., account information) is transmitted with the additional state information from the input sensor appended, identifying the input sensor as active. At block 625, the data (i.e. both the requested data and the additional state information) is received and applied to rules in a PI rules database (e.g., by the host computer system). At block 630, an authorization is output (e.g., by based at least in part on information from the input sensor).

Figure 7:
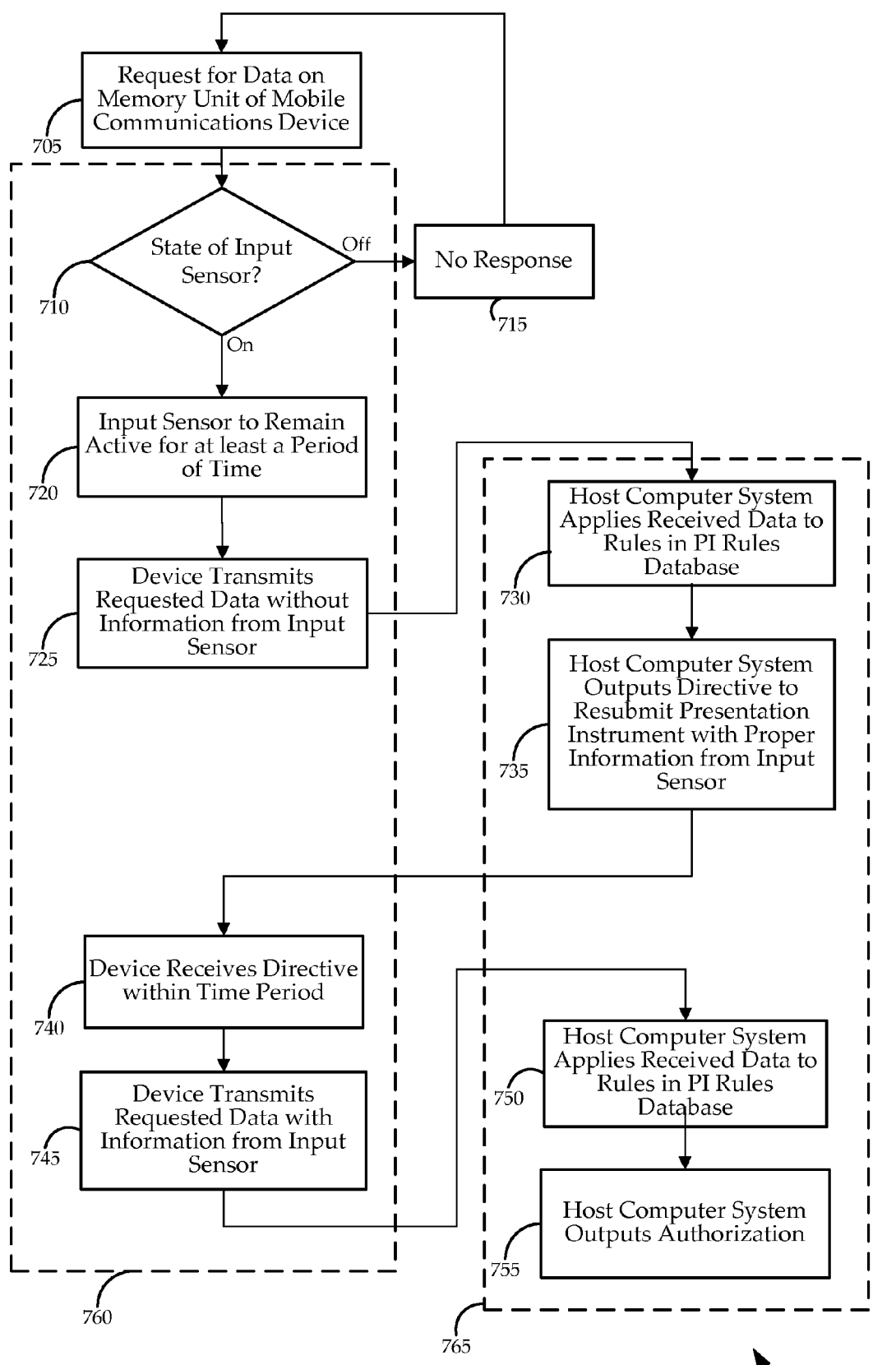
FIG. 7 illustrates an alternative method for processing information and input from a mobile communications device configured according to various embodiments of the present invention.

FIG. 7 sets forth another exemplary embodiment 700 of the invention, illustrating an alternative method of processing a transaction with a device. The method may, for example, be performed by the mobile communications device (100, 150, 175) of FIGS. 1A, 1B, or 1C in communication with a host computer system 520 of FIG. 5. At block 705, a request for data (e.g., account number data) is transmitted (e.g., by a point of sale device). The data may be located on the memory unit of the mobile communications device. At block 710, an input sensor will be in one of two states, which will be referred to in this example as "on" or "off." At block 715, if the input sensor is in the off state, there will be no response because the non-active state renders applicable components of the mobile communications device not functional or operational. However, as illustrated at block 720, the input sensor may alternatively be in the "on" state, and if so will remain there for a specified period of time (e.g., because when the input sensor crosses above or below a threshold level of contact, pressure, light, or capacitance, the sensor remains in the "on" state for at least a period of time). If "on," the mobile communications device at block 725 transmits the requested data (e.g., account information, location, amount, merchant, etc.), but does not transmit additional state information from the input sensor.

At block 730, the received data is applied to rules in PI rules database (e.g., by a host computer system). At block 735, a directive is output to resubmit the presentation instrument with proper information from the input sensor, as called for by the rules. At block 740, the device (perhaps via a point of sale terminal) receives the directive within its operational time period (i.e., before it has returned to the off state). At block 745, the device transmits the requested data with the state information from the input sensor. At block 750, received data (including the input from the input sensor) is applied (e.g., by the host computer system) to rules in PI rules database. At block 755, an authorization is output based at least in part on the input sensor information. This flow chart provides an example of the possible interrelation between the mobile communications device functionality (illustrated by the dashed line identified by reference numeral 760) and the host computer system functionality (illustrated by the dashed line identified by reference numeral 765).

Figure 8:
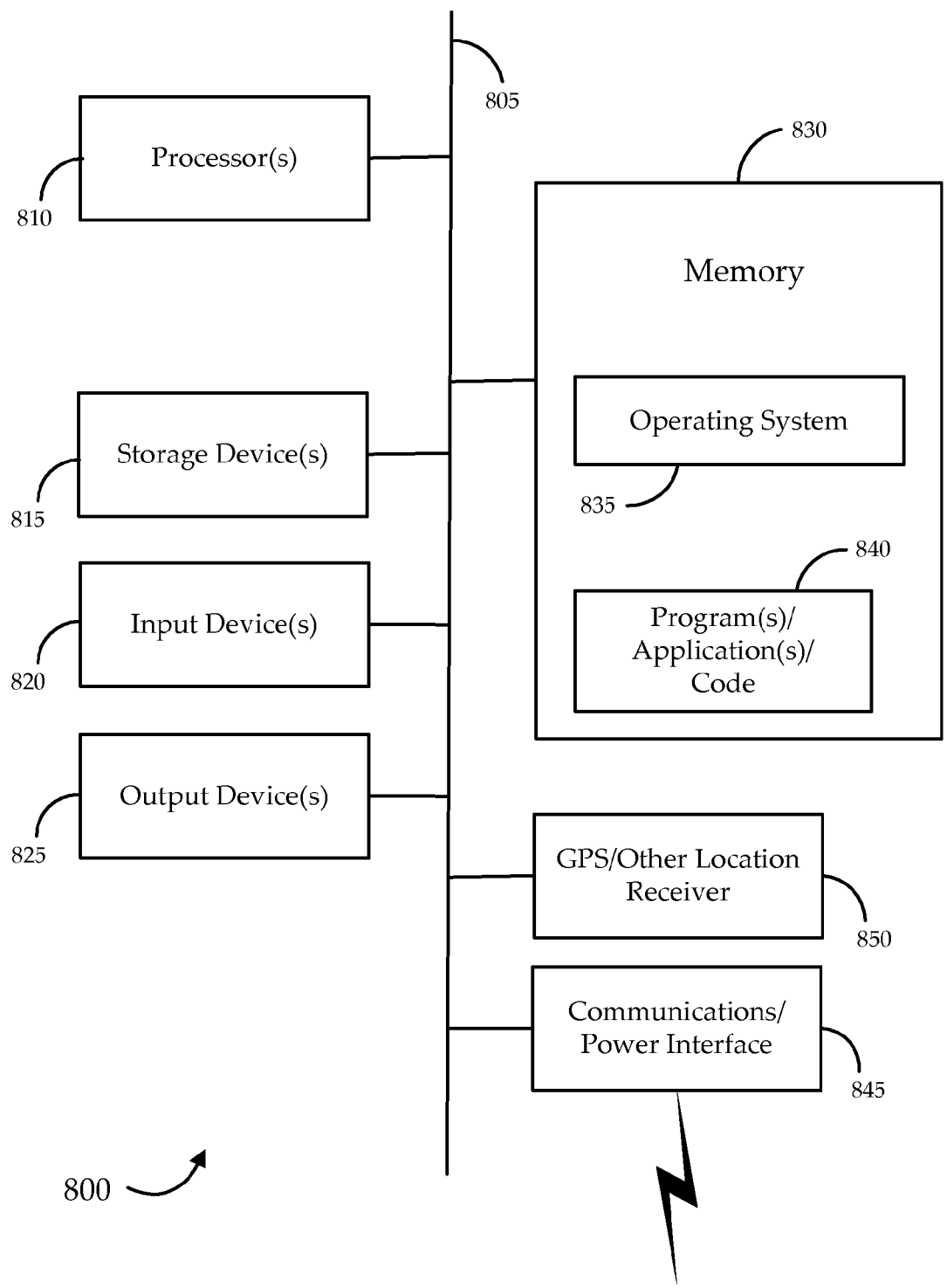
FIG. 8 is a schematic diagram that illustrates a representative device structure that may be used in various embodiments of the present invention.

A device structure 800 that may be used for a host computer, server, point-of-sale device, terminal, reader, mobile communications device or other computing device described herein is illustrated with the schematic diagram of FIG. 8. This drawing broadly illustrates how individual system elements of each of the aforementioned devices may be implemented, whether in a separated or more integrated manner. The exemplary structure is shown comprised of hardware elements that are electrically coupled via bus 805, including processor(s) 810 (which may further comprise a DSP or special-purpose processor), storage device(s) 815, input device(s) 820, and output device(s) 825. The storage device(s) 815 may comprise a computer-readable storage media reader connected to any computer-readable storage medium, the combination comprehensively representing remote, local, fixed, or removable storage devices or storage media for temporarily or more permanently containing computer-readable information. The communications/power interface(s) 845 may comprise a wired, wireless, or other type of interfacing connection and/or antenna that permits data and/or power to be exchanged with other devices. The communications/power interface 845 may permit data to be exchanged with a network (including, without limitation, the Network 515).

The structure 800 may also include additional software elements, shown as being currently located within working memory 830, including an operating system 835 and other code 840, such as programs or applications designed to implement methods of the invention. The structure may include a GPS or other Location Receiver 850, to receive and provide location based data. It will be apparent to those skilled in the art that substantial variations may be used in accordance with specific requirements. For example, customized hardware might also be used, or particular elements might be implemented in hardware, software (including portable software, such as applets), or both.

It should be noted that the methods, systems and devices discussed above are intended merely to be exemplary in nature. It must be stressed that various embodiments may omit, substitute, or add various procedures or components as appropriate. For instance, it should be appreciated that in alternative embodiments, the methods may be performed in an order different than that described, and that various steps may be added, omitted or combined. Also, features described with respect to certain embodiments may be combined in various other embodiments. Different aspects and elements of the embodiments may be combined in a similar manner. Also, it should be emphasized that technology evolves and, thus, many of the elements are exemplary in nature and should not be interpreted to limit the scope of the invention.

Specific details are given in the description to provide a thorough understanding of the embodiments. However, it will be understood by one of ordinary skill in the art that the embodiments may be practiced without these specific details. For example, well-known circuits, processes, algorithms, structures, and techniques have been shown without unnecessary detail in order to avoid obscuring the embodiments.

Also, it is noted that the embodiments may be described as a process which is depicted as a flowchart, a data flow diagram, or a block diagram. Although these diagrams may describe the operations as a sequential process, many of the operations can be performed in parallel or concurrently. In addition, the order of the operations may be re-arranged. A process is terminated when its operations are completed, but could have additional steps not included in the figure.

Moreover, as disclosed herein, the terms "memory unit" and "means for storing data" may represent one or more devices for storing data, including read only memory (ROM), random access memory (RAM), magnetic RAM, core memory, magnetic disk storage mediums, optical storage mediums, flash memory devices or other machine readable mediums for storing information. The term "computer-readable medium" includes, but is not limited to, portable or fixed storage devices, optical storage devices, wireless channels, a sim card, other smart cards, and various other mediums capable of storing, containing or carrying instructions or data.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a computer readable medium, such as a memory unit. Processors may perform the necessary tasks.

Having described several embodiments, it will be recognized by those of skill in the art that various modifications, alternative constructions, and equivalents may be used without departing from the spirit of the invention. For example, the above elements may merely be a component of a larger system, wherein other rules may take precedence over or otherwise modify the application of the invention. Also, a number of steps may be required before the above elements are considered. Accordingly, the above description should not be taken as limiting the scope of the invention, which is defined in the following claims.

What is claimed is:

1. A mobile communications device comprising:
   a memory unit configured to store financial account information for use in a transaction;
   an input sensor configured to receive an input;
   an antenna configured to:
      draw power from an external source to induce a voltage for the mobile communications device;
      wirelessly receive a first set of electromagnetic waves comprising a signal including a request for the financial account information to be applied to a transaction; and
      transmit a wireless signal responsive to the request comprising a second set of electromagnetic waves including the financial account information; and
   a processing unit coupled with the memory unit, the input sensor, and the antenna, wherein the processing unit is prevented from being powered from the external source without an input received at the input sensor, and wherein the processing unit is configured to:
      access the memory unit to retrieve the requested data; and
      add an additional set of data to the financial account information for transmission via the wireless signal, the additional set of data representative of the received input from the input sensor.

2. The mobile communications device of claim 1, wherein, the memory unit further comprises a secure storage region; and
   the processing unit is configured to control access to the secure storage region based on an input received at the input sensor.

3. The mobile communications device of claim 2, wherein, the processing unit is configured to prevent access to the secure storage region unless a substantially concurrent input is received at the input sensor.

4. The mobile communications device of claim 1, wherein the input sensor is limited to a first state and a second state.

5. The mobile communications device of claim 4, wherein the received input from the input sensor comprises no input; and
   the received input causes the input sensor to be in the first state.

6. The mobile communications device of claim 1, wherein, the input sensor comprises a plurality of input sensors; and
   different combinations of input among the plurality of sensors result in different resulting states for the input sensor.

7. The mobile communications device of claim 6, wherein the input sensor receives:
   a biometric reading; and
   a password input.

8. The mobile communications device of claim 7, wherein the password input comprises an input received at a subset of the plurality of input sensors.

9. The mobile communications device of claim 1, wherein the input sensor includes one or more input sensors comprising a selection from the group consisting of a dual contact point switch, a capacitance switch, a light sensor, a multi-position slide switch, and any combination thereof.

10. The mobile communications device of claim 1, wherein the financial account information comprises a credit card account number, a debit card account number, an ATM card account number, a stored value account number, or a bank account number.

11. The mobile communications device of claim 1, wherein the input sensor is distinct from a keypad of the mobile communications device.

12. The mobile communications device of claim 1, wherein the memory unit, the input sensor, the antenna, and the processing unit are independent from mobile communication components of the mobile communications device.

13. The mobile communications device of claim 1, wherein the processing unit is further configured to encapsulate the additional set of data and the financial account information together in a single data packet for transmission via the wireless signal.

14. A mobile communications device comprising:
   means for wirelessly receiving a first set of electromagnetic waves comprising a signal including a request for financial account information to be applied to a transaction;
   means for receiving an input;
   means for storing data;
   means for wirelessly transmitting a second set of electromagnetic waves comprising a signal including:
      the requested financial account information from the storing means; and
      data representative of the received input; and means for wirelessly drawing power from an external source to induce a voltage for the mobile communications device, wherein the means for wirelessly transmitting is prevented from being powered from the external source without a substantially concurrent input received at the means for receiving the input.

15. The mobile communications device of claim 14, further comprising:

a processing means configured to control access to a secure storage region based on an input received at the input means, wherein, the means for storing data further comprises the secure storage region.

16. A mobile communications device comprising:

a memory unit configured to store financial account information for use in a transaction;

an antenna coupled with the memory unit, and configured to:
draw power from an external source to induce a voltage for the mobile communications device;
wirelessly receive a first set of electromagnetic waves comprising a signal including a request for the financial account information to be applied to a transaction; and
transmit a wireless signal responsive to the request comprising a second set of electromagnetic waves including the financial account information;

the input sensor coupled with the memory unit and configured to receive an input, wherein the requested information is prevented from being transmitted unless a first input is substantially concurrent with the receipt of the request; and a processing unit coupled with the memory unit, the antenna, and the input sensor, wherein the processing unit is prevented from being powered from the external source without an input received at the input sensor.

17. The mobile communications device of claim 16, further comprising:

a processing unit coupled with the memory unit, and configured to allow access to an unsecured storage region regardless of the received first input, wherein the memory unit further comprises the unsecured storage region.

18. The mobile communications device of claim 16, further comprising:

a processing unit coupled with the input sensor, and configured to:
receive the first input from the input sensor; and
control, based at least in part on the received first input, whether the requested data stored on the memory unit is transmitted.

19. The mobile communications device of claim 18, wherein, the antenna comprises an inductively coupled transponder configured to induce a voltage from a magnetic field to power the presentation instrument; and the received first input determines whether the processing unit may be powered from the magnetic field.

20. The mobile communications device of claim 16, wherein, the memory unit further comprises an additional secure storage region; and the processing unit is configured to control access to the additional secure storage region based on an second input received at the input sensor.

21. The mobile communications device of claim 16, wherein the input sensor is limited to a first state and a second state.

22. The mobile communications device of claim 21, wherein the received input from the input sensor comprises no input; and the received input causes the input sensor to be in the first state.

23. The mobile communications device of claim 16, wherein, the input sensor comprises a plurality of input sensors; and different combinations of input among the plurality of sensors result in different resulting states for the input sensor.

24. The mobile communications device of claim 16, wherein the input sensor includes one or more input sensors comprising a selection from the group consisting of a dual contact point switch, a capacitance switch, a light sensor, a multi-position slide switch, and any combination thereof.

25. The mobile communications device of claim 16, wherein the financial account information comprises a credit card account number, a debit card account number, an ATM card account number, a stored value account number, or a bank account number.

26. The mobile communications device of claim 16, wherein the input sensor is distinct from a keypad of the mobile communications device.

27. A mobile communications device comprising:

means for wirelessly drawing power from a source external to the mobile communications device to produce a voltage for the mobile communications device;

means for wirelessly receiving a first set of electromagnetic waves comprising a signal including a request for the financial account information to be applied to a transaction;

means for processing the received set of data;

means for wirelessly transmitting a second set of electromagnetic waves comprising a responsive signal; and means for receiving an input, wherein the input controls whether the drawing means is able to wirelessly draw power from the external source to produce a voltage for the processing means, wherein the means for wireless transmitting is prevented from being powered from the source without a substantially concurrent input received at the means for receiving the input.

* * * * *